Patented June 23, 1936

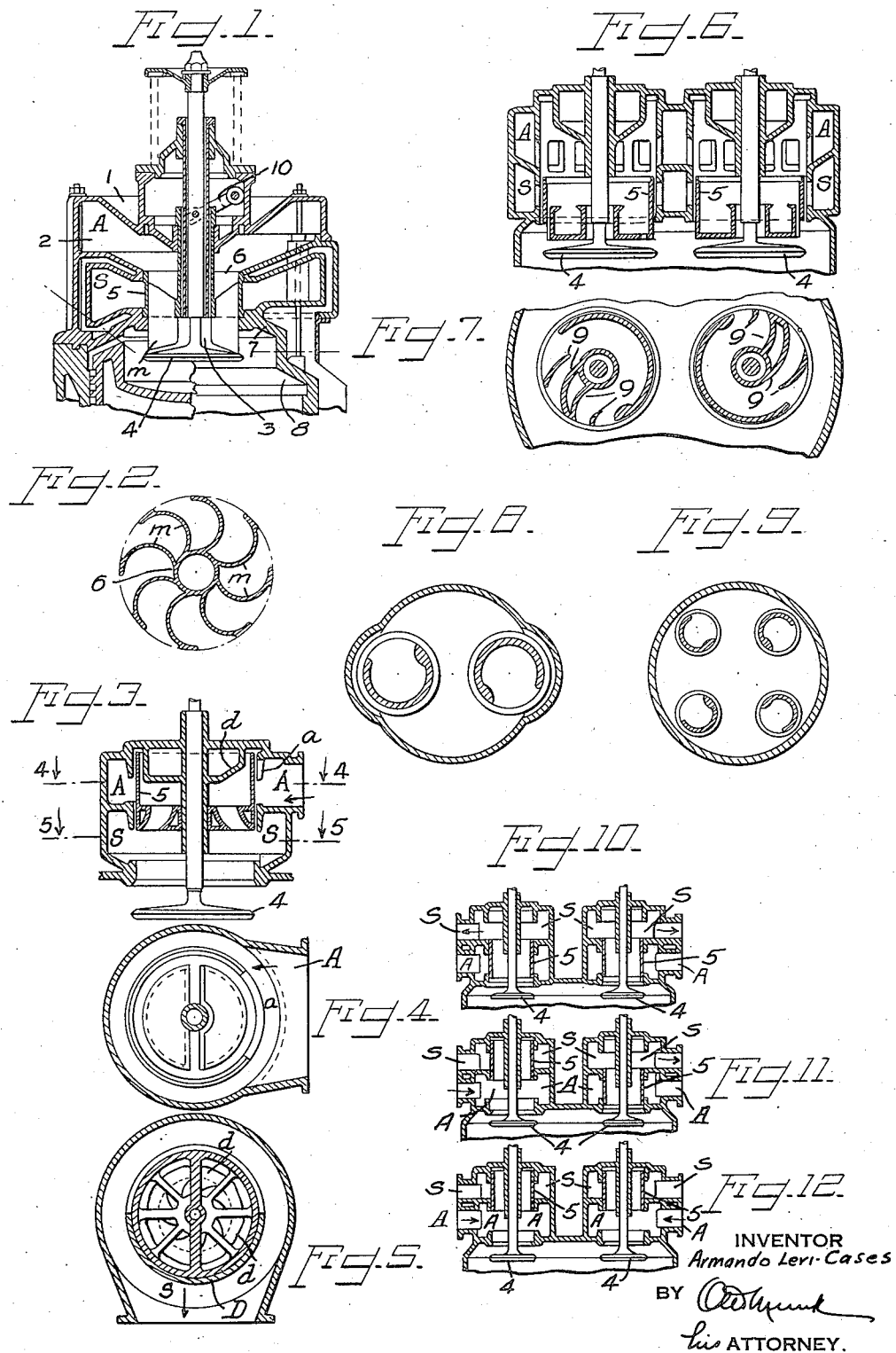

2,045,122

UNITED STATES PATENT OFFICE 2,045,122

FOUR-STROKE-CYCLE ENGINE WITH COMBINED ADMISSION AND EXHAUST VALVE GEAR

Armando Levi Cases, Padova, Italy

Application May 12, 1932, Serial No. 610,766
In Italy May 12, 1931

5 Claims. (Cl. 123—79)

This invention relates to four-stroke internal combustion engines of the kind comprising combined valves for exhaust and inlet, each of these valves having a port opening into the engine cylinder. More particularly, the invention relates to engines of the compression-ignition type having liquid fuel injection, operation of which is brought to a very high thermodynamic efficiency by the employment of devices adapted to impart rotational movement to the incoming charge, with the ultimate object of causing effective rotational movement of the charge about the axis of the engine cylinder. The speed of this rotational movement has a value which is a multiple of the angular speed of the engine crank and is determined in accordance with, for instance, the time required for the fuel injection under normal engine load.

In order to obtain efficient action in this respect in engines comprising combined inlet and exhaust valves, arrangements must be provided for preventing an undue slowing down of the flow through the common valve passage for the inlet and exhaust gases as well as for avoiding undesirable disturbances due to general structural details of the valve and for ensuring that the desired rotational movement of the charge shall be conserved when the charge is diffusing radially after admission into the cylinder proper.

According to the present invention, the devices for imparting the tangential movement to the incoming charge are located in at least one passageway traversed by the inflowing charge and the exhaust gases, said devices being so arranged as to be rendered partially or completely inoperative during the exhaust period of the cycle.

According to a further feature of the invention, in cases in which the cylinder is provided with two or more valves, the latter are arranged to be supplied with the incoming charge at substantially equal pressures, and are each provided with devices for imparting to the portion of the charge entering the cylinder through the valve a suitable rotational movement such that the combined rotational movements of the portions of the charge admitted through the several valves will produce a rotational movement of the charge as a whole.

In accordance with a further feature of the invention, the end of the cylinder adjacent to the valve itself is so formed as to deflect and guide the movement of the air and especially to guide the swirling charge during its radial diffusion towards the side walls of the cylinder.

In accordance with a further feature of the invention, the devices for imparting rotational movement to the charge are arranged to be adjustable so as to permit the final angular speed attained by the swirling charge to be varied as desired in accordance with, for instance, the running conditions of the engine.

Further features of the invention relate to arrangements for obtaining a flow of scavenging air through the valve chamber, or through the cylinder during the period of change over from inlet to exhaust.

In order that the invention may be readily understood it will now be described with reference to the accompanying drawing, of which Fig. 1 is a view in vertical section of the cylinder head of a four-stroke engine having a single central valve, embodying one form of the invention, the valve being shown in its inlet open-position;

Fig. 2 is a sectional view on an enlarged scale of a portion of the guiding surfaces for causing the rotational movements of the incoming charge in the construction of Fig. 1;

Fig. 3 is a view similar to Fig. 1, of a construction in which arrangements are provided for introducing scavenging air before the normal inlet connection is established and before the exhaust connection is completely interrupted;

Figs. 4 and 5 are sectional views of the construction taken along section lines 4—4, and 5—5, respectively of Fig. 3;

Figs. 6 and 7 are views in longitudinal and transverse section, respectively, of the cylinder head of a four-stroke engine having dual combined inlet and exhaust valves, embodying the invention;

Fig. 8 is a diagrammatic cross-sectional view of the upper part a cylinder provided with dual combined valves and illustrating a modification in the location of the valves relatively to the cylinder wall;

Fig. 9 is a horizontal section of one of the combined valves of a twin valve cylinder having displaceable directing blades for imparting the tangential movements to the incoming charge, the blades being located in passageways traversed both by the incoming charge and by the exhaust gases.

Figs. 10, 11 and 12 are sectional views of a cylinder head comprising two similar combined inlet and exhaust valves illustrating the scavenging action effected in accordance with the invention, Figs. 10, 11 and 12 showing the positions of the valve elements corresponding to exhaust, scavenging and inlet conditions, respectively.

Referring now to the construction shown in Figs. 1 and 2, it will be seen that the cylinder head 1 comprises a central valve chamber 2 communicating with the upper end of the cylinder by means of a valve port 3 controlled by a combined inlet and exhaust valve 4. The latter is adapted to cooperate with a cylindrical slide valve or sleeve 5 adapted to move axially within the valve chamber 2 so as to establish communication between the chamber 2 and an inlet chamber A or an exhaust chamber S depending whether the sleeve valve 5 occupies its inlet position shown in Fig. 1 or its exhaust position.

The lower end of the sleeve valve 5 carries suspended therefrom a guide member 6 comprising a number of curved guide vanes $m$ (see Fig. 2) and it will be understood that the valve 4 and the sleeve valve 5 are arranged to be operated by suitable mechanism so that during the inlet cycle the sleeve valve 5 is in its lower position shown in Fig. 1 in which communication between the valve chamber 2 and the exhaust chamber S is cut off. The incoming charge passes from the inlet chamber A to the valve chamber 2 and thence through the guide vanes $m$ and the valve port 3 into the engine cylinder so long as the valve 4 is open. It will be seen that the vanes $m$ impart a rotational movement to the incoming charge and the swirling current of gas thus produced is guided into the body of the cylinder by coming into contact with the annular surfaces 7, 8 formed on the upper end of the cylinder wall.

During the exhaust cycle the sleeve valve 5 occupies an upper position in which communication between the valve chamber 2 and the inlet chamber A is cut off, the burnt charge passing out of the cylinder through the valve port 3 (so long as the valve 4 is open) into the valve chamber and thence directly to the exhaust chamber S passing partially through the vanes $m$ of the guide element 6 while it is being raised by the sleeve valve.

The guide element 6 is as shown in Fig. 1 mounted on a sleeve surrounding the stem of the valve 4, the sleeve being adapted to be operated by a lever 10.

In the construction above described, any suitable arrangements may be provided for adjusting the action of the guide vanes $m$ on the incoming charge as for instance by varying the extent to which the guide element 6 is moved downwards towards the valve port 3 for the inlet stroke of the engine.

An important advantage of employing separate inlet and exhaust chambers A, S as above described, is that it permits periodic scavenging of the valve chamber 2 to be effected which is desirable particularly in forced feed engines.

In Figs. 3, 4 and 5 (of which Fig. 4 is a sectional view from below of the upper portion of the valve chamber), an arrangement is illustrated adapted to improve the operation of forced feed engines by enabling periodical scavenging of the valve chamber by the periodical formation of efficient scavenging currents between the inlet and exhaust (which also affect the combustion chamber) before the complete cut-off of the exhaust connection and before the establishment of the normal inlet connection. The upper portion of the seat of the sleeve valve 5 is provided adjacent to the inlet chamber A with an extended slot $a$ which forms a supplementary inlet passage when the sleeve valve 5 moves downwards. A sloping baffle $d$ is provided, the central portion of which constitutes a guide for the stem of the valve 4, the baffle $d$ serving to deflect the scavenging current downwards. At the level of the exhaust chamber S a semi-cylindrical wall D (Fig. 5) is provided which serves as a further guide for the descending scavenging current to prevent any direct flow of air to the exhaust.

Figs. 6 and 7 illustrate a similar arrangement to that of Fig. 1 applied to a two valve construction. The sleeve valves 5 are in this case provided with guide vanes 9 (see Fig. 7) and the outlet of the charge from the interior of the sleeve valve to the cylinder is limited as shown to one part of the circumference of the sleeve valve, so as to cause the outflow from the two valves to be in the same rotary direction in the cylinder. The shape of the guide vanes 9 is indicated in these figures somewhat diagrammatically but they have the general form of a spiral in cross section.

In the construction shown in Figs. 8 and 9, the valves in the cylinder head are arranged closer to the walls of the cylinder (in Fig. 8 the projection of the valve even intersects to a certain extent the projection of the cylinder wall itself) and thus permit the cylinder wall to influence the flow of the incoming charge so as to obtain the desired rotary movement of the charge within the cylinder.

Fig. 9 illustrates a construction in which the devices for imparting the tangential movements to the incoming charge are represented by two sets of displaceable blades located in two passageways traversed by the inflowing charge and by the exhaust gases. The inflowing charge traverses these passageways before it enters the cylinder and the blades are partially or entirely displaced during the exhaust period in order to enlarge the areas of the sections which are opened to the flow of exhaust gases.

It will be understood that with the constructions shown in Figs. 6, 7, and 8 the rotary movement of the charge entering the cylinder can be controlled and influenced by adjusting the angular setting of the sleeve valves of the individual valves about their own axes. The charge entering the cylinder may be controlled also in the manner shown in Fig. 9 by varying the angular setting of the directing blades during the intake period.

An admission of scavenging air may be arranged to be effected when two or more valves are provided for each cylinder, this scavenging action being obtained by the temporary admission of air through one or more of the valves, the remaining valve or valves remaining, during the scavenging phase, in communication with the exhaust.

This scavenging action is obtained by the different timing of the sleeve valves of the several valves (an advance in timing being imparted to the valve or valves intended to admit air during the scavenging phase) as illustrated for example in the double valve arrangement of Figs. 10, 11 and 12.

In Fig. 10 both the slide valves are shown in their lower position so that the cylinder is open to exhaust. In Fig. 11 the left-hand sleeve valve is in its upper position and the right-hand sleeve valve is in its lower position so that air enters the cylinder from the inlet chamber A of the left-hand valve and leaves the cylinder through the exhaust chamber S of the right-hand valve thus scavenging the valve chambers and the compression space of the cylinder. In Fig. 12 a further stage in the cycle is shown in which both slide valves are in their upper position for the admission of a fresh charge.

It will be understood that the invention may also be applied to double acting engines, in which one or both of the cylinder heads embodies valve arrangements of the kind above described.

Having now particularly described and ascertained the nature of my said invention and in what manner the same is to be performed, I declare that what I claim is:

1. A four-stroke internal combustion engine having inlet and exhaust passages and cylinders provided with at least one combined inlet and exhaust valve, said valve having a member periodically opening into the associated cylinder and a sleeve valve associated with said valve for periodically and alternately establishing communication of the cylinder with the inlet and exhaust passages, said sleeve valve having means comprising impelling members for imparting a rotatory movement to the gaseous charge in its passage from the inlet towards the cylinder.

2. A four-stroke internal combustion engine having inlet and exhaust passages and cylinders provided with at least one combined inlet and exhaust valve, said valve having a member periodically opening into the associated cylinder and a sleeve valve associated with said valve for periodically and alternately establishing communication of the cylinder with the inlet and exhaust passages, said sleeve valve having means comprising impelling members for imparting a rotatory movement to the gaseous charge in its passage from the inlet towards the cylinder, said impelling members being at least partially withdrawn from the path of the exhaust gases during their discharge from the cylinder.

3. A four-stroke internal combustion engine having cylinders provided with at least one combined inlet and exhaust valve, said valve having a chamber opening into the associated cylinder and means within said chamber for imparting a rotatory movement to the gaseous charge during its passage towards the cylinder, said chamber being alternately traversed both by the incoming charge and by the outflowing gases, said means for imparting rotatory movement to the charge being at least partially withdrawn from the path of the exhaust gases during their discharge from the cylinder.

4. A four-stroke internal combustion engine having cylinders provided with at least one combined inlet and exhaust valve, said valve having a chamber opening into the associated cylinder and means within said chamber for imparting a rotatory movement to the gaseous charge during its passage towards the cylinder, said chamber being alternatively traversed both by the incoming charge and by the outflowing gases, said means for imparting rotatory movement to the charge being operated from outside of the cylinder and at least partly withdrawn from the path of the exhaust gases during their discharge from the cylinder.

5. A four-stroke internal combustion engine having cylinders provided with at least one combined inlet and exhaust valve, valve chamber and inlet and exhaust passage, said valve having a member opening periodically into the associated cylinder, a sleeve valve in said chamber, coaxial and movable with respect to said valve for periodically and alternately establishing communication of the cylinder port with the inlet and exhaust passage, said sleeve valve having means comprising impelling members for imparting a tangential and rotatory movement to the gaseous charge in its passage towards the cylinder, said chamber being alternately traversed both by the incoming charge and by the outflowing gases, and said impelling means being at least partially withdrawn from the path of the exhaust gases during their discharge from the cylinder.

ARMANDO LEVI CASES.